United States Patent
Tye

Patent Number: 6,063,890
Date of Patent: May 16, 2000

[54] POLYCARBODIIMIDE POLYMERS AND THEIR USE AS ADHESIVE INTERMEDIATE LAYERS IN AUTOMOTIVE COATINGS

[75] Inventor: Anthony J. Tye, Waterville, Ohio

[73] Assignee: BASF Corporation, Southfield, Mich.

[21] Appl. No.: 09/108,497

[22] Filed: Jul. 1, 1998

[51] Int. Cl.$^7$ .......................... C08G 18/10; C08G 18/64; C08G 18/71; C08G 18/81

[52] U.S. Cl. ............................... 528/45; 528/65; 528/69; 528/75; 528/76; 528/77

[58] Field of Search ............................... 525/418; 528/45, 528/65, 69, 75, 76, 77

[56] References Cited

U.S. PATENT DOCUMENTS 4,118,536  10/1978  Beardsley et al. ...................... 428/413
5,258,481  11/1993  Hesselmans et al. ...................... 528/28

*Primary Examiner*—Nathan M. Nutter
*Attorney, Agent, or Firm*—Anne Gerry Sabourin

[57] ABSTRACT

The invention is directed to a block copolymer with the following representative structure:

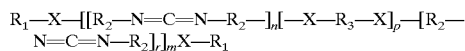

Where:
m=1 to 20
n=1 to 20
p=0 or 1

$R_1$=A monomeric or polymeric species containing only one functional group reactive with an isocyanate group. This species may also have another reactive functional group that is not reactive with a carbodiimide functionality such as an alkoxy silane.

$R_2$=The radical from any available aliphatic, cycloaliphatic or shielded aromatic diiocyanate.

$R_3$=Preformed polymer blocks such as a polyester, polyacrylate, polyurethane, polyether, polyethylene, polycarbonate, polyurea polysiloxane or similar hybrids.

X=any combination of:

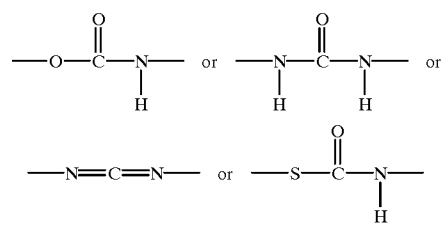

The copolymer may be used in various automotive paint compositions. The resin may be prepared by first synthesizing the desired blocks, the polycarbodiimide blocks and the modifying blocks, then link them together. The resin may also be prepared by forming the polycarbodiimide directly onto the modifying blocks. The latter approach is the preferred one. The modifying blocks are prepared in the conventional manner for the chemistry and the choice of the modifying blocks depend on the application. For proper topcoat wetting, it is desired that some portion of the modifying blocks be highly polar.

7 Claims, No Drawings

POLYCARBODIIMIDE POLYMERS AND THEIR USE AS ADHESIVE INTERMEDIATE LAYERS IN AUTOMOTIVE COATINGS

FIELD OF THE INVENTION

This invention relates to a novel polycarbodiimide polymer. The use of this class of polymers result in coatings that provide an intermediate layer that is adhesive to both a wide variety of substrates and to a number of coating technologies, particularly those technologies commonly used in automotive coatings.

Automotive paint compositions, where the novel polycarbodiimide polymer has been found useful, include primer and sealer compositions.

BACKGROUND

The present invention is directed to novel polycarbodiimide compounds, their method of preparation, and their use in one-package, ambient cure automotive paint compositions. It is often desirable to be able to apply several ambient curable coating technologies over the substrates typically found on an automobile. These substrates could range from bare metal to plastics to the original equipment manufacturer's (OEM) coatings. The ambient curable coating technologies may range from thermoplastic acrylic lacquers to air-oxidizing alkyds to two-component acrylic urethanes.

In order to achieve this range of substrate adhesion, an intermediate coating, also known as a "mid-coat" or "tie-coat", is applied to the substrate prior to topcoating. This intermediate layer needs to be adherent to the substrate well as the top coating to be effective. The mid-coat must also develop these adherent properties rapidly, in order to prevent a tearing of the applied layer once the masking tape is removed in multi-layer or multi-"tone" applications, and retain its adherent qualities even after being subjected to the elements of exterior exposure, such as high and low temperatures, high humidity conditions and ultraviolet radiation. An ideal mid-coat would also ensure proper adhesion on substrates that are improperly prepared.

In addition to the aforementioned properties, there are many desirable attributes of a mid-coat adhesion promoter. Aside from being adherent, the coating needs to be transparent and color stable, as to not affect the color of the substrate in cases where only a clear coating is applied, one-package, for ease of use, and retain its film integrity as a topcoat, because in many applications, the adhesion promoter is applied beyond the repair area.

Carbodiimide compounds, particularly aliphatic carbodiimides, are known to be reactive with a number of functional groups such as carboxyl, amine, mercaptan, epoxy, isocyanate and hydroxyl, groups that appear frequently on substrate surfaces and in coating technologies. This property, in addition to the excellent wetting behavior of carbodiimides prepared from typical isocyanates make them well suited as primer vehicles. Carbodiimide polymers are well known in the art as being well suited as a hardening component for two-package primer vehicles. U.S. Pat. No. 4,118,536 describes the use of a one-package carbodiimide primer prepared exclusively from aromatic isocyanates and terminated with alkoxysilanes. Polycarbodiimides prepared from aromatic isocyanates are generally high in color and of low reactivity. Furthermore, undesirable UV induced effects are common when aromatic groups are conjugated with an isocyanate or the reaction products of isocyanates, due presumably to the creation of quinoid-like structures. Mixed aliphatic/aromatic polycarbodiimides may also be high in color, depending on the relative amount of the aromatic component, require special processing and are suspect for UV durability for reasons just mentioned. The invention described herein has rapid adhesion to a wide variety of substrates, does not necessarily require alkoxy silane to be effective, is a one package application, transparent, weathers well and provides excellent humidity and ultimate adhesion over a wide variety of scuffed and unscuffed substrates.

SUMMARY OF THE INVENTION

The invention is a coating comprised of a block copolymer with the following representative structure:

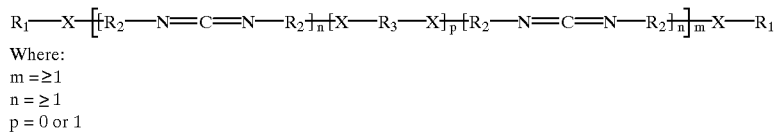

Where:
m = ≥1
n = ≥1
p = 0 or 1

$R_1$=A monomeric or polymeric species containing only one functional group reactive with an isocyanate group. This species may also have another reactive functional group that is not reactive with a carbodiimide functionality such as an alkoxy silane.

$R_2$=The radical from any available aliphatic, cycloaliphatic or shielded aromatic diisocyanate.

$R_3$=Preformed polymer blocks such as a polyester, polyacrylate, polyurethane, polyether, polyethylene, polycarbonate, polyurea, polysiloxane or similar hybrids.

X=any combination of:

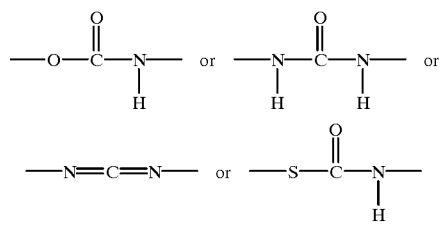

The resin may be prepared by first synthesizing the desired blocks, the polycarbodiimide blocks and the modifying blocks, then link them together. The resin may also be prepared by forming the polycarbodiimide directly onto the modifying blocks. The latter approach is the preferred one. The modifying blocks are prepared in the conventional manner for the chemistry and the choice of the modifying blocks depend on the application. For proper topcoat wetting, it is desired that some portion of the modifying blocks be highly polar.

After the polycarbodiimide block is combined with the modifying block, the residual isocyanate groups are then capped with a monofunctional modifier, which has one isocyanate reactive group. This capping agent may be monomeric or polymeric in character and may have an additional functional group that is non-reactive with a carbodiimide group, such as an alkoxy silane, to further enhance the performance of the coating.

The coating composition is then prepared by diluting the abovementioned polycarbodiimide resin in suitable solvents and combining additives such as UV absorbers, silicones, plasticizers, etc., to create a coating composition. The non-volatile content of the formulation is kept low to ensure that a thin layer is applied.

The finished coating is applied via air atomization to the substrate, allowed to air dry, then topcoated in the usual manner.

The advantages provided by the invention is that when this resin is formulated into and applied as a mid-coat adhesion promoter, it imparts rapid adhesion of the ultimate topcoat to the substrate. This property will allow trouble-free taping of the basecoat in multi-layer applications, where tape edge peeling is a concern. This invention also provides excellent humidity and ultimate adhesion, even after being subjected to the elements of exterior exposure, such as cold temperatures, high humidity conditions and ultraviolet radiation, over a wide variety of scuffed and unscuffed substrates.

DETAILED DESCRIPTION OF THE INVENTION

This invention defined herein is directed to polycarbodiimide compounds, their method of preparation and their use in a coating composition. The use of this class of polymers provides an adhesive layer to a wide variety of substrates for a wide variety of subsequent coatings layers, particularly automotive coatings.

The invention is a coating comprised of a block copolymer with the following representative structure:

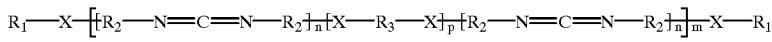

Where:
m = ≥ 1
n = ≥ 1
p = 0 or 1

$R_1$ = A monomeric or polymeric species containing only one functional group reactive with an isocyanate group. This species may also have another reactive functional group that is not reactive with a carbodiimide functionality such as an alkoxy silane.

$R_2$ = The radical from any available aliphatic, cycloaliphatic or shielded aromatic diisocyanate.

$R_3$ = Preformed polymer blocks such as a polyester, polyacrylate, polyurethane, polyether, polyethylene, polycarbonate, polyurea, polysiloxane or similar hybrids.

X = any combination of:

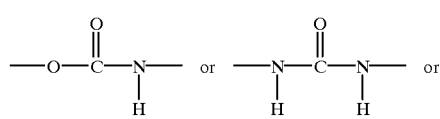

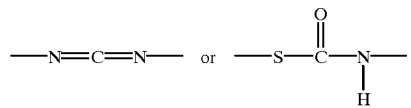

The resin may be prepared by first synthesizing the desired polymer blocks, selected from the group consisting of polyester, polyacrylate, polyurethane, polyether, polyethylene, polycarbonate, polyurea, polysiloxane and mixtures thereof the polycarbodiimide blocks and the modifying blocks, then link them together by their terminal groups. The resin may also be prepared by forming the polycarbodiimide directly onto the modifying blocks. This is accomplished by reacting isocyanates such as aliphatic and cycloaliphatic mono and polyisocyanates and aromatic isocyanates where the isocyanate groups are separated from the isocyanate groups by saturated carbon atoms with modifying blocks. Said modifying blocks may comprise polyester diols, polyacrylate diols, polyacrylates terminated with thioglycerol, polyurethane diols, polyether diols, polyether diamines, polysiloxane diols and mixtures thereof. The latter approach is the preferred one. The modifying blocks are prepared in the conventional manner for the chemistry and the choice of the modifying blocks depend on the application. For proper topcoat wetting, it is desired that some portion of the modifying blocks be highly polar.

After the polycarbodiimide block is combined with the modifying block, the residual isocyanate groups are then capped with a monofunctional modifier, which has one isocyanate reactive group. This capping agent may be monomeric or polymeric in character and may have an additional functional group that is non-reactive with a carbodiimide group, such as an alkoxy silane, to further enhance the performance of the coating.

The polycarbodiimide blocks of the invention can be prepared in a variety of ways. In synthesis, the methods described in U.S. Pat. No. 5,047,588 can be utilized where the carbodiimides are prepared by the reaction of mono-, di-, and optionally tri-functional isocyanates, with the easiest structures to conceptualize being based on mono- and diisocyanates in the molar ratio of about 2:1 to about 2:10 mono- to diisocyanates to yield a carbodiimide, with the evolution of carbon dioxide, by the following equation:

This process usually requires a catalyst, and the preferred catalyst is, according to the patent, 3-methyl-1-phenyl-2-phospholene-1-oxide.

In the preferred synthetic procedure, a reaction vessel, equipped with a heating and a cooling element, agitation, condenser and an inert gas subsurface sparge, is charged with cycloaliphatic, aliphatic, or shielded aromatic diisocyanate and any modifying blocks. The mixture is then heated to 60–80° C. and held until the functional groups on the modifying blocks are completely consumed by the isocyanate. If a capping agent is an isocyanate functional compound, a stoichiometric amount is also charged at this stage.

Exemplary aliphatic and cycloaliphatic mono and polyisocyanates include: butyl isocyanate, cyclohexyl isocyanate, octadecyl isocyanate, 1,4-tetramethylhexamethylenediisocyanate, 1,6-hexanediisocyanate, 1,12 dodecanediisocyanate, 2,2,4- and 2,4,4-trimethylhexamethylendiisocyanate, 1,4-cyclohexanediisocyanate, bis(4-isocyanatocyclohexyl)methane, isophoronediisocyanate, dipentenediisocyanate.

Shielded aromatic polyisocyanates include meta- and para-tetramethylxylenediisocyanate. Although these isocyanate compounds have aromatic character, the isocyanate groups are removed from the aromatic ring and shielded by saturated carbon atoms. As expected, these isocyanate compounds behave as aliphatic isocyanates in reactivity and properties.

Exemplary modifying blocks would include: polyester diols, polyacrylate diols, or macromonomers type polyacrylates terminated with thioglycerol, polyurethane diols, polyether diols or diamines, polyethylene/butylene diols, polycarbonate diols, polyurea diamines, polysiloxane diols or diamines or similar hybrids.

Solvents may be used in the synthesis to reduce the viscosity of the reaction mass. Suitable solvents are those that are non-reactive such as aromatic hydrocarbons, aliphatic esters, glycol ether esters, glycol diesters or ketones, if primary amines are not used in the synthesis. The solvent should have a sufficient boiling point to allow the preferred reaction temperatures.

Catalyst is usually introduced in a dry, non-reactive solvent, such as xylenes. The preferred catalyst, for reasons of efficacy and availability, is 3-methyl-1-phenyl-2-phospholine-1-oxide at levels between 0.1 and 1.5 molar %.

The reactants are heated to 140–170° C. with an inert gas sparge, typically nitrogen, to facilitate the loss of $CO_2$ and held at that temperature until the percent isocyanate value is within the desired value. The conversion of isocyanate can be monitored using the ASTM method D-11638-74 NCO titration. Evolved $CO_2$ may also be trapped and measured as an indication of extent of conversion. Once the desired conversion level has been achieved, if the capping agent is not an isocyanate compound, the mixture is then cooled to 60–75° C. and the capping agent is introduced.

Suitable non-isocyanate capping agents would include monofunctional alcohols, mercaptans, amines, aminoalkylalkoxy silanes. These monofunctional compounds could be monomeric or polymeric in composition.

The content of the reactor are held at 60–75° C. until the isocyanate is no longer detected. In some cases, it may be necessary to increase the temperature to 140–170° C. or to add an excess of the capping agent to ensure that the isocyanate groups are entirely consumed. The progress of the reaction may be monitored with an infrared spectrometer, observing the emergence of the carbodiimide peak (at approximately 2125 $cm^{-1}$) and the disappearance of the isocyanate peak (at approximately 2260 $cm^{-1}$).

The coating is prepared by diluting the polycarbodiimide resin in suitable solvents and combining additives such as UV absorbers, silicones, plasticisers, etc. to create a coating composition. The non-volatile content of the coating composition is kept low (below 25% non-volatile) to ensure a thin film after application.

DESCRIPTION OF THE PREFERRED EMBODIMENTS

The examples that follow illustrate the invention in various useful embodiments, but are not intended to limit the invention in any way.

EXAMPLE I

A one liter, 4-neck flask, fitted with a condenser, an agitator, thermocouple and subsurface nitrogen inlet was charged with 204 gms. of isophorone diisocyanate, 24.4 gms. m-tetramethylxylenediisocyanate, and 5 gms. of xylenes. Under agitation, a mixture of 34.3 gms. aminopropyltrimethoxysilane and 92.1 gms. xylenes was added uniformly over one hour. 1.2 gms. of a 30% solution of 3-methyl-1-phenyl-2-phospholine-1-oxide in xylenes was charged and the mixture heated to an initial reflux temperature of 166° C. The mixture was refluxed approximately 12.5 hours until a percent isocyanate value of 1.0% (ASTM method D-11638-74 NCO titration) was obtained. The mixture was then cooled to 70–80° C. and 7.9 gms. of benzyl alcohol and 179.8 gms. of methylisobutyl ketone were charged to the flask. The mixture was then held at 70–80° C. approximately sixteen hours until a negligible percent NCO value was obtained. The mixture is then cooled to ambient temperatures and dispensed.

EXAMPLE II

A one liter, 4-neck flask, fitted with a condenser, an agitator, thermocouple and subsurface nitrogen inlet was charged with 237.5 gms. of isophoronediisocyanate, 12.5 gms. m-tetramethylxylenediisocyanate, and 57.3 gms. xylenes. Under agitation, a mixture of 37.5 gms. of a polypropylene oxide diamine polymer (under the tradename JEFFAMINE® D-400) and 42.5 gms. xylenes was added uniformly over two hours. A mixture of 37.5 gms. of aminopropyltrimethoxysilane and 73.9 gms. of xylenes was added uniformly over two hours. 2.6 gms. of a 30% solution of 3-methyl-1-phenyl-2-phospholine-1-oxide in xylenes was then charged and the mixture heated to an initial reflux temperature of 157° C. The mixture is held at reflux until an percent isocyanate value of 1.90% (ASTM method D-11638-74 NCO titration) was obtained. The mixture is then cooled to 60–70° C. and 210 gms. of methyl isobutyl ketone and 26.4 gms. of di-n-butyl amine are added. The mixture is then cooled to ambient temperatures and dispensed.

EXAMPLE III

A one liter, 4-neck flask, fitted with a condenser, an agitator, thermocouple and subsurface nitrogen inlet was charged with 237.5 gms. of isophoronediisocyanate, 12.5 gms. m-tetramethylxylenediisocyanate, and 57.3 gms. xylenes. 27.0 gms. of 2-hydroxyethyl pyrrolidinone and 0.3 gms. of a 1% solution of dibutyltin dilaurate in xylenes was added and the mixture was heated under agitation to 60–75° C. until a constant percent isocyanate value was obtained. To the flask a mixture of 37.5 gms. of a polypropylene oxide diamine polymer (under the tradename JEFFAMfNE® D-400) and 116.4 gms. xylenes was added uniformly over two hours. 7.8 gms. of a 10% solution of 3-methyl-1-phenyl-2-phospholine-1-oxide in xylenes was then charged and the mixture heated to an initial reflux temperature of 151° C. The mixture is held at reflux until an percent isocyanate value of 1.95% (ASTM method D-11638-74 NCO titration) was obtained. The mixture is then cooled to 60–75° C. and 166.5 gms. of methyl isobutyl ketone and 24.7 gms. of di-n-butyl amine are added. The mixture is then cooled to ambient temperatures and dispensed.

EXAMPLE IV

A one liter, 4-neck flask, fitted with a condenser, an agitator, thermocouple and subsurface nitrogen inlet was charged with 237.5 gms. of isophoronediisocyanate, 12.5 gms. m-tetramethylxylenediisocyanate, 70.8 gms. of hydrogenated polybutadienediol (under the tradename KRATON® L-2203 from Shell Chemical Co.) and 98.2 gms. xylenes. The mixture was heated to 60–75° C. until a constant percent isocyanate content was reached. A mixture of 33.1 gms. of aminopropyltrimethoxysilane and 25.2 gms. of xylenes was added uniformly over two hours. 3.9 gms. of a 10% solution of 3-methyl-1-phenyl-2-phospholine-1-oxide in xylenes was then charged and the mixture heated to an initial reflux temperature of 168° C. The mixture is held at reflux until an percent isocyanate value of 0.5% (ASTM method D-11638-74 NCO titration) was obtained. The mixture is then cooled to 60–70° C. and 87 gms. of methyl isobutyl ketone was added. 114.5 gms. of 2-propanol was then added and the mixture was heated to reflux at about 88–92° C. and held until no residual isocyanate groups were detected. The mixture is then cooled to ambient temperatures, an additional 100 gms. of 2-propanol was added and the batch dispensed.

EXAMPLE V

In order to demonstrate the present invention, coatings formulations were prepared from examples I–IV by diluting each resin with a solvent blend with the following composition:

| | |
|---|---|
| Methyl isobutyl ketone | 49.0% |
| n-Butyl acetate | 49.0% |
| Ethyl 3-ethoxypropionate | 2.0% | to approximately 5% non-volatile content. The coatings were applied via air atomization to panels that were previously coated with a properly cured OEM basecoat/clearcoat finish. Each coating was allowed to air dry approximately fifteen minutes before an automotive refinish basecoat was applied over the intermediate layers. The basecoats were allowed to air dry for thirty minutes. Initial adhesion was tested by scribing an "X" on the coated panel, placing a piece of adhesive tape over the scribe and uniformly pulling the tape from the scribe. All of the test coatings had improved adhesion as compared to the control, a refinish basecoated panel with no intermediate layer.

A portion of these panels were also clearcoated. The clearcoats were allowed to cure for seven days then subjected to 100% relative humidity at 110° F. for 96 hours. The adhesion was tested as before with all of the test coatings having improved adhesion as compared to the control, a refinish basecoat/clearcoated panel with no intermediate layer.

I claim:

1. A polycarbodiimide polymer comprising the reaction product of compounds selected from the group consisting of polyester diols, polyacrylate diols, polyacrylates terminated with thioglycerol, polyurethane diols, polyether diols, polyether diamines, polysiloxane diols, polysiloxane diamines and mixtures thereof with polyisocyanates selected from the group consisting of aliphatic and cycloaliphatic mono and polyisocyanates and a monomeric or polymeric compound comprising a functional group reactive with the isocyanate group, for capping the isocyanate, wherein the carbodiimide has the structure:

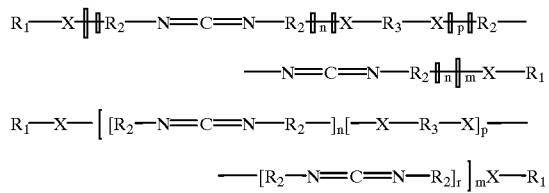

where:
m = 1 to 20
n = 1 to 20
p = [0 or] 1

$R_1$ is a monomeric or polymeric species containing only functional group reactive with an isoc;yanate group;

$R_2$ is a radical resulting from the reaction available aliphatic, cycloaliphatic and shielded aromatic diisocyanate;

$R_3$ = preformed polymer blocks selected from the group consisting of polyester, polyacrylate, polyurethane, polyether, polyethylene, polycarbonate, polyurea polysiloxane or similar hybrids;

X is any combination of

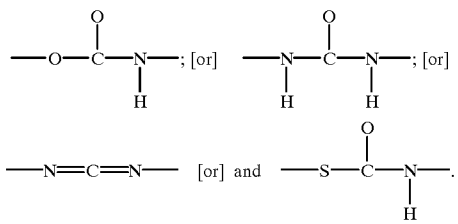

2. An automotive paint composition comprising a polycarbodiimide polymer comprising the reaction product of compounds selected from the group consisting of polyester diols, polyacrylate diols, polyacrylates terminated with thioglycerol, polyurethane diols, polyether diols, polyether diamines, polysiloxane diols, polysiloxane diamines and mixtures thereof with polyisocyanates selected from the group consisting of aliphatic and cycloaliphatic mono and polyisocyanates and a monomeric or polymeric compound comprising a functional group reactive with the isocyanate group, for capping the isocyanate, wherein the carbodiimide has the structure:

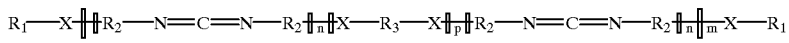

where:
m=1 to 20
n=1 to 20
p=1

$R_1$ is a monomeric or polymeric species containing only one functional group reactive with an isocyanate group;

R₂ is a radical resulting from the reaction of available aliphatic, cycloaliphatic and shielded aromatic diisocyanate;

R₃=preformed polymer blocks selected from the group consisting of polyester, polyacrylate, polyurethane, polyether, polyethylene, polycarbonate, polyurea polysiloxane or similar hybrids;

X is any combination of

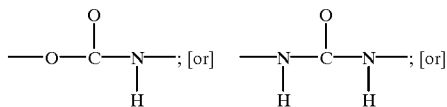

[or]

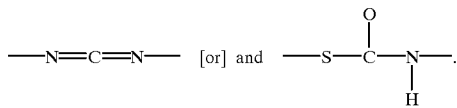

3. The paint composition of claim 2 wherein the paint composition is a primer composition.

4. The paint composition of claim 2 wherein the paint composition is a sealer composition.

5. A carbodiimide polymer according to claim 1 wherein the capping agent reactive with the isocyanate groups further comprises a functional group that is non reactive with a carbodiimide group.

6. A carbodiimide polymer according to claim 1, wherein the capping agent is selected from the group consisting of compounds comprising alkoxy silane functionality.

7. A composite coating comprising a first layer of a pigmented paint composition according to claim 2, said first layer having applied directly thereto a clearcoat composition.

* * * * *